US008418739B2

(12) United States Patent
Robinson

(10) Patent No.: US 8,418,739 B2
(45) Date of Patent: Apr. 16, 2013

(54) HEAT SEAL MACHINE WITH OPEN THROAT

(75) Inventor: Benjamin B. Robinson, Smithfield, PA (US)

(73) Assignee: Stahls' Inc., St. Clair Shores, MI (US)

( * ) Notice: Subject to any disclaimer, the term of this patent is extended or adjusted under 35 U.S.C. 154(b) by 258 days.

(21) Appl. No.: 12/727,963

(22) Filed: Mar. 19, 2010

(65) Prior Publication Data

US 2011/0076079 A1 Mar. 31, 2011

Related U.S. Application Data

(60) Provisional application No. 61/245,876, filed on Sep. 25, 2009.

(51) Int. Cl.
*B32B 37/00* (2006.01)

(52) U.S. Cl.
USPC ......... 156/358; 156/359; 156/366; 156/583.1

(58) Field of Classification Search .................. 156/351, 156/258, 259, 366, 580, 581, 583.1, 583.8, 156/583.9, 358, 359
See application file for complete search history.

(56) References Cited

U.S. PATENT DOCUMENTS

| | | | | |
|---|---|---|---|---|
| 5,252,171 | A * | 10/1993 | Anderson et al. | 156/583.1 |
| 2005/0278984 | A1 | 12/2005 | Kenney | |
| 2007/0017641 | A1 * | 1/2007 | Kenney | 156/583.1 |

FOREIGN PATENT DOCUMENTS

| | | |
|---|---|---|
| EP | 0983848 | 3/2000 |
| EP | 2218574 | 8/2010 |
| FR | 2836151 | 8/2003 |
| WO | WO-2008/107742 | 9/2008 |

OTHER PUBLICATIONS

Partial International Search Report for PCT/US2010/050017.

* cited by examiner

*Primary Examiner* — James Sells
(74) *Attorney, Agent, or Firm* — Rader, Fishman & Grauer PLLC

(57) ABSTRACT

A press is described having an upper platen. The press includes one piece base for support an upper rotatable support arm and a lower cantilever support arm. The upper support arm is adapted to selectively move the upper platen between an open position, a partially open position and a closed position with respect to a lower platen. A lower cantilever support arm configured to provide an open working surface around a lower platen. A sliding mechanism disposed on the base to selectively move the lower platen to an open, partially open or closed position.

19 Claims, 6 Drawing Sheets

HEAT SEAL MACHINE WITH OPEN THROAT

CROSS-REFERENCE TO RELATED APPLICATION

This Application claims the benefit of U.S. Provisional Application 61/245,876 filed on Sep. 25, 2009.

TECHNICAL FIELD

The embodiments described herein are generally directed to a heat transfer press.

BACKGROUND

Heat applied transfers include a variety of indicia with inks, material layers, and adhesives that become bonded to material layers, for example, apparel such as shirts, jackets, or the like, upon pressurized contact and heating of the transfers and apparel between press platens. New developments in the construction and composition of lettering have resulted in high quality transfers that can be accurately and quickly transferred to the apparel without bleeding or partial interruptions in the bonding of the transfer, as long as the presses can be operated at a predetermined temperature for a predetermined time and at a predetermined pressure while providing a smooth adherence surface on the apparel. Nevertheless, heat applied transfer presses must be simple, manually operated devices in order to satisfy the user's need to economically but quickly apply various lettering, symbols and numbering indicia selected by a customer and which must be applied to a selected piece of apparel. Such an apparatus must accommodate many variations in the arrangement of transfers and apparel, as well as the types of transfers and apparel materials available.

Conventional heat transfer press machines are of two general types. The two types include a clam shell type and a swing away type. Both machines include upper and lower platens which are movable relative to one another and create a sealing surface when joined together. A heat source is included in at least one platen to create the thermal bonding of the transfer. The clam shell type includes a hinge where the upper and lower platens are interconnected at one side, which causes difficulty in positioning the selected piece of apparel. The swing away type includes a pivot point on one side allowing the upper platen to swivel to one side or the other, which improves the access to position the apparel but still results in difficulty as the lower platen is fixed at the base.

These heat transfer press machines are known for applying graphic images on textiles or other similar substrates, or to press foil onto an apparel of various shapes and sizes. However, when utilizing a textile or substrate of an unusual size and shape the platens must be able to provide a smooth surface to transfer on. Conventional heat transfer press machines do not always provide such a surface, which results in an uneven transfer and potential damage to the apparel. Therefore, there exists a need in the art to provide an improved heat transfer press machine for forming better resolution in graphic images by providing access to both the upper and lower platen, thereby providing the ability to slide a piece of textile or apparel around the lower platen. For example, a device that forms a smoother surface on a substrate will providing better print resolution and a smoother feel to a printed garment.

SUMMARY

In the embodiments described, a press is employed having an upper platen and lower platen. The press includes a support arm adapted to selectively swivel the upper platen creating an open load area as well as to selectively move the upper platen between an open and a closed position or a position between. A cantilever lower platen support is attached to the underside of the lower platen and a base of the cantilever support is attached to a sliding draw mechanism providing the lower platen with an open throat area as well as providing increased access to a working surface of the lower platen. The press includes a touchtone screen control interconnected to a control board having remote diagnostic and thumb wheel drive capabilities.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION

Figure 1:
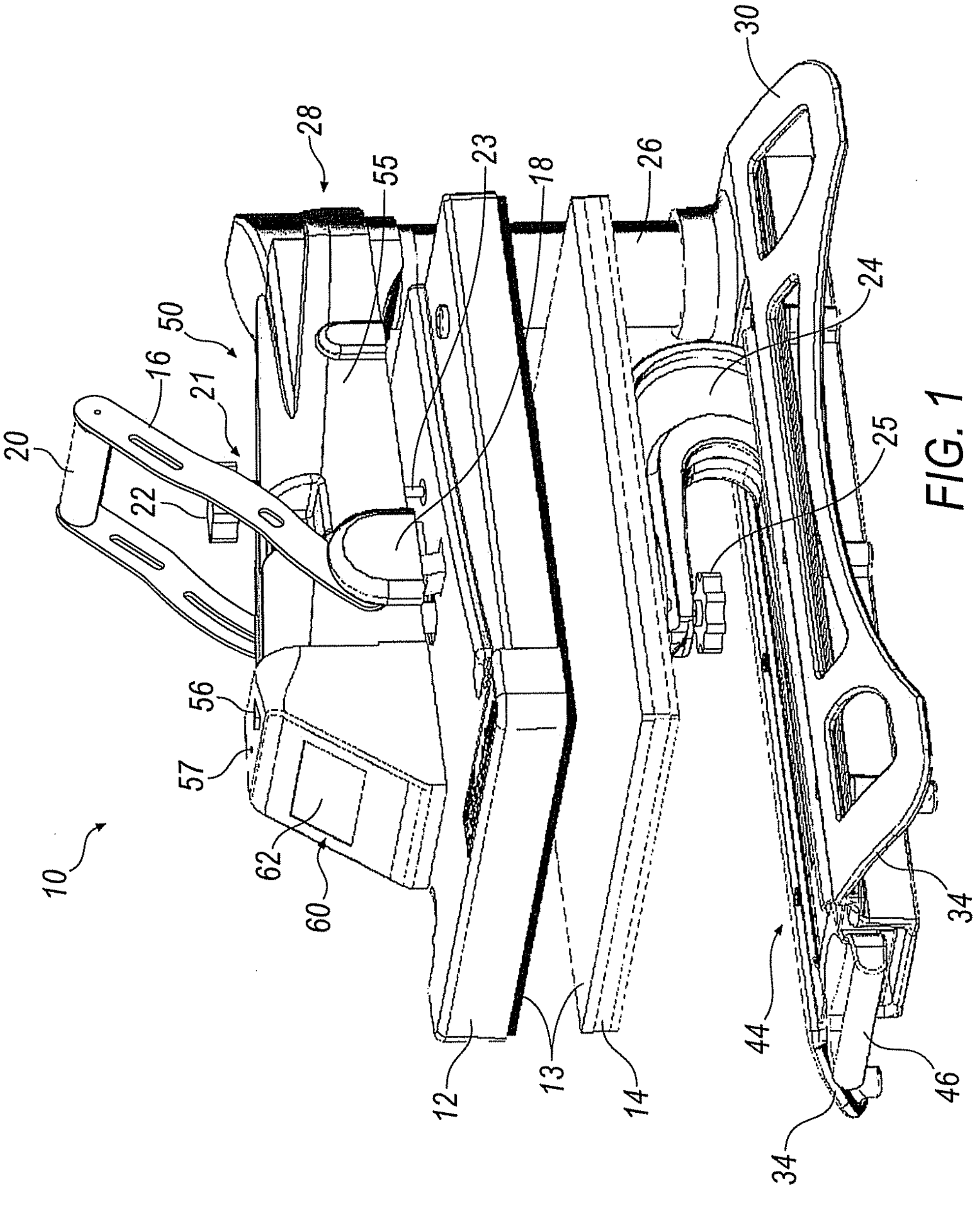
FIG. 1 is a perspective view of an arrangement of a transfer press in a partially opened position with a lower platen and an upper platen aligned.

Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limit or restrict the invention to the precise form and configuration shown in the drawings and disclosed in the following detailed description.

The term "platen" as used throughout the specification is defined hereinafter to include but is not limited to: a work structure of a machine tool and a generally flat plate of a press that presses a material. The term "pivot" or any variation thereof such as "pivotally" as used throughout the specification is defined hereinafter to include but is not limited to: a rod or shaft on which a related part rotates or swings; the act of turning on or as if on a pivot; to cause to rotate, revolve, or turn; and to mount on, attach by, or provide with a pivot or pivots. The term "heating element" as used throughout the specification is defined hereinafter to include but is not limited to: a component that transforms fuel or electricity into heat. The term "gas spring" as used throughout the specification is defined hereinafter to include but is not limited to: an actuating force; a component placed in mechanical compression or extension; and a component providing a compression or extension force.

Figure 5:
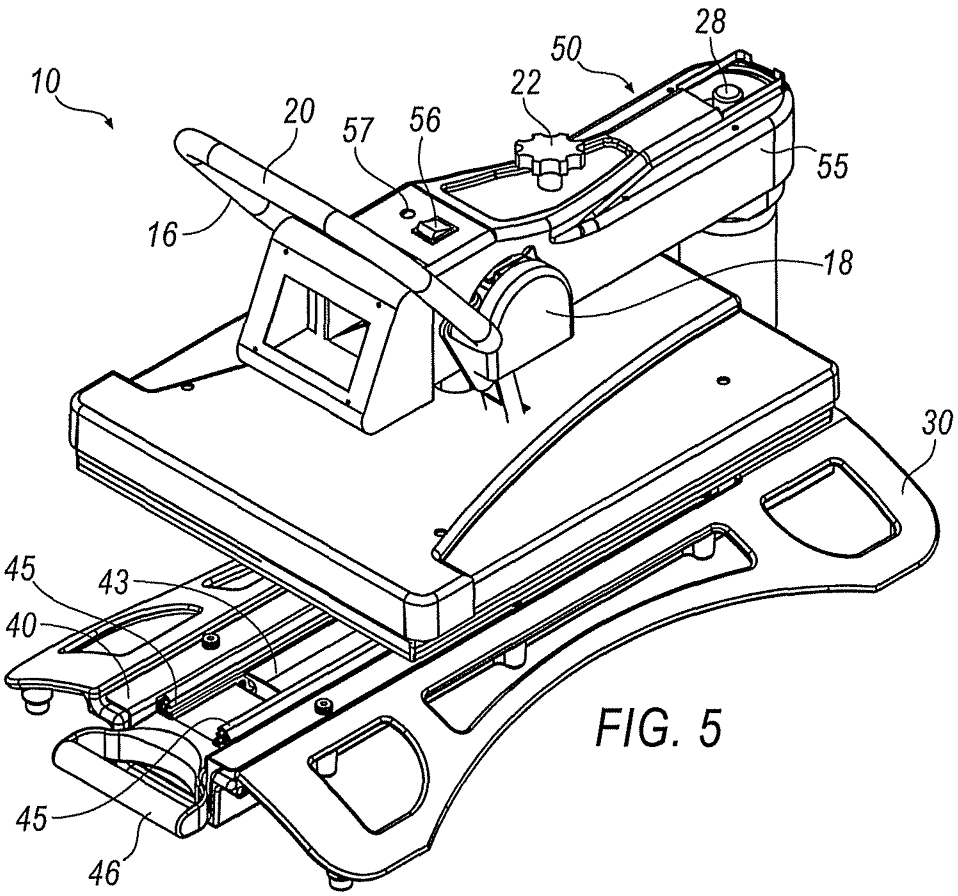
FIG. 5 illustrates a perspective view of an arrangement of a transfer press with an upper and lower platen in the closed position.

Referring first to FIGS. 1 and 5, an arrangement for a heat applied transfer press 10 having relatively moveable upper and lower platens 12, 14 with a heat source (not shown) in the upper platen 12. The heat press 10 is shown with the upper platen 12 spaced above the lower platen 14 to provide working clearance for loading or unloading a textile apparel (not shown). The heat press 10 includes a base frame 30 for supporting a c-shaped lower cantilever support arm 24 and a spindle tube 26. The spindle tube 26 supports a rotating assembly 28 and multi-piece upper support arm 50. The multi-piece upper support arm 50 includes a knob handle 52 (FIGS. 6 and 8) protruding from the underside of the upper support arm 50 and is graspable by the operator for rotational movement to swing the upper support arm 50 and correspondingly attached upper platen 12 in a horizontal plane above the lower platen 14 and base frame 30.

An arrangement for the rotating assembly 28 may include a rotating spindle secured to and positioned through an aperture 59 in the upper support arm 50 and extending into an aperture in the spindle tube 26. Brass bushings may be used as inserts in each aperture to provide a lubricated rotating surface within each aperture. However, a standard bearing may also be used in place of the brass bushings to provide smooth rotation. A two part right/left ring stop is positioned between the upper support arm and the spindle tube to provide a swing-lock positive stop when rotating the upper support arm. The rotating assembly combines the steel spindle with the aluminum spindle tube without the need of welding as it is impossible to weld the two dissimilar metals. The swing-lock fasteners may be low profile socket head cap screws that extend through a counter-bored aperture in the right swing-lock and into a threaded aperture in the steel rotating spindle and aluminum spindle tube. The fastener actually crosses the threads of the aluminum spindle tube with the threads of the steel rotating spindle. The crossing of the threads allows the rotating assembly 28 to be built without welding, as the two dissimilar metals are mechanically fused together.

With continued reference to FIG. 1, the upper support arm 50, houses a controller 60, the rotating spindle assembly 28, an over center locking assembly 18 and a pressure adjustment assembly 21. The adjustment assembly 21 controls the spacing between the upper platen 12 and lower platen 14 surfaces in the closed position. Accordingly, the press 10 may include platen pads such as an insulating pad 13 for accommodating surface irregularities occurring on the material to be worked on or on the heat applied transfers to be inserted between the platens 12 and 14 for application to the material including apparel.

A heating element (not shown) is included in at least one platen, and preferably the upper platen 12. The heating element may be conventional resistive heating elements and the like, which may be formed as serpentine or otherwise wound throughout the surface area of the platen 12. The heating element is coupled to a typical power supply through a switch 56 having an indicator light 57 mounted to the upper cantilever support arm housing 51. The switch 56 may be configured for adjusting the temperature of the heating element. Further, the temperature of the heating element may be adjusted at a visual display 62. In addition, the upper platen 12 carries a thermocouple sensor (not shown) which is wired in a conventional manner to generate temperature information at the visual display 62.

With continued reference to FIG. 1, the locking assembly 18 is activated by a lift lever 16 having a handle 20. The lift lever 16 is operated by a human operator who pulls the lever down or pushes the lever up to move the platens 12, 14 from an open, loading/unloading position, to a closed, pressing position or a position between. When the upper platen 12 is lowered it provides a compressive load to the lower platen 14, attached lower cantilever support 24, corresponding sliding mechanism 44 and base frame 30. The compressive force applied by the locking assembly 18 and the adjustment knob 22, transferred through the threaded rod 23, is measured by a pressure sensor (not shown) that sends a corresponding measurement to the controller 60 and corresponding visual display 62.

The visual display 62 is mounted for exposure to the area occupied by the press operator positioned for manipulating and controlling the operating arm 50. The visual display 62 is interconnected to a controller 60. The controller 60 receives inputs from the digital display in the form of entered text or numeric data. These inputs are sent to the controller 60 in the form of electrical current. The controller 60 then activates the heating element for a predetermined time. The electrical circuit for the heating element includes a temperature control such as a thermostat which is adjusted and viewed at the visual display 62 or automatically by the controller 60. In addition, the visual display 62 includes a timer control (not shown), which provides a perceptible indication to the operator manipulating the lift lever handle 20. Although a simple mechanical spring type timer may be used, an automatic timing system utilizing an automatic proximity sensor and digital display counter in the controller 60 may be used. The operator can also observe the real time numeric values for time, temperature and pressure as shown in the visual display 62. When utilizing the automatic programming in the controller 60 the operator can pre-program set points for time, temperature and pressure for repetitive transfer jobs. The controller 60 may be updated either remotely with remote diagnostic input port capabilities or the controller 60 may be updated manually with a thumb wheel through an auxiliary input port. The remote diagnostic capability is achieved through a common connection and enables the manufacturer or programmer to adjust or troubleshoot the controller 60 as needed.

As also shown in FIGS. 1, 3 and 5-8, the adjuster 21 includes a threaded aperture (not shown) in the upper cantilever support arm 50 adapted to threadingly engage a threaded rod 23 having an attached adjustment knob 22. The threaded rod 23 extends through the support arm 50 and up and down movement is controlled by the adjustment knob 22 relative to the support arm 50. The threaded engagement between the rod 23 and the support arm 50 permits adjustment of the upper platen 14 in the vertical direction for fine tuning the compressive forces between the upper and lower platens 12, 14. The locking assembly 18 connects the upper support arm 50 to the upper platen 12 and provides straight-line vertical motion to the upper platen 12. It is also contemplated that the adjuster 21 may be any known adjustable device adapted to apply force through the upper support arm 50 while maintaining a fixed position extending radially into intersection with the upper support arm 50. Thus, while the rod 23 is threaded in a correspondingly threaded aperture 53 through the support arm 50, adjuster 21 may be constructed as any means for adjusting the height of the upper platen 12, or adjusting the spacing between the upper and lower platens 12, 14 in the closed position.

Figure 2:
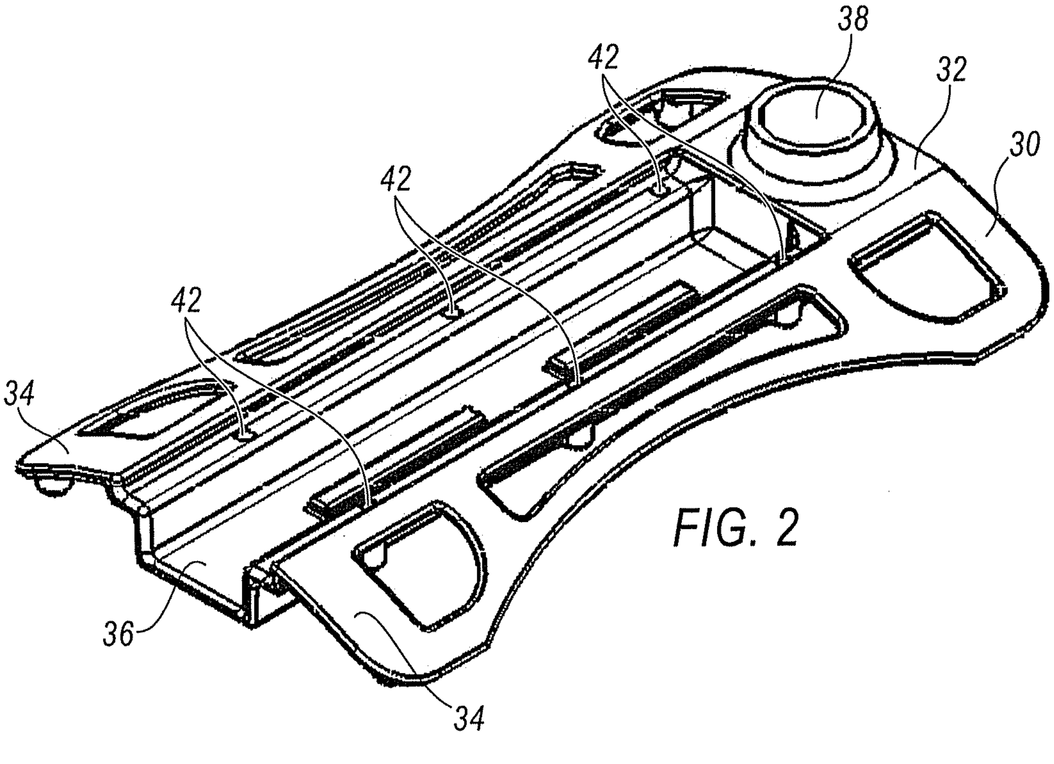
FIG. 2 is a perspective view of a base frame.
Figure 3:
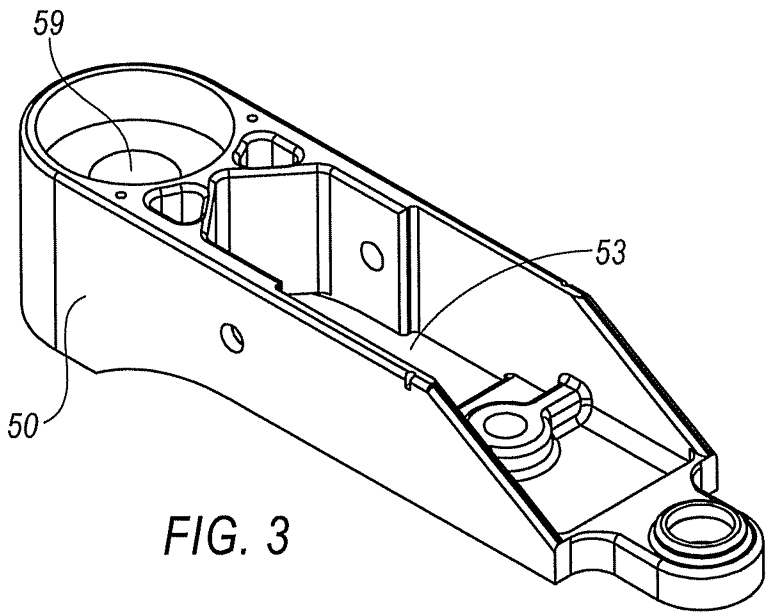
FIG. 3 is a perspective view of a support channel.

FIG. 2 illustrates one arrangement where the base frame 30 is constructed from a single aluminum casting with a central load supporting member 32. The base frame 30 includes outwardly arched and webbed supports 34. This arrangement, single aluminum webbed casting base 30, provides an excellent high strength to low weight ratio. However, the base frame 30 may be made from any material providing a rigid platform, i.e., aluminum, iron, steel, powder metal or other known composite. Also, it is understood that the base frame 30 may be made from many configurations such as an I-beam, X-beam or other suitable configurations able to support a center load bearing member 32 having outer supports 34 providing lateral support.

Figure 8:
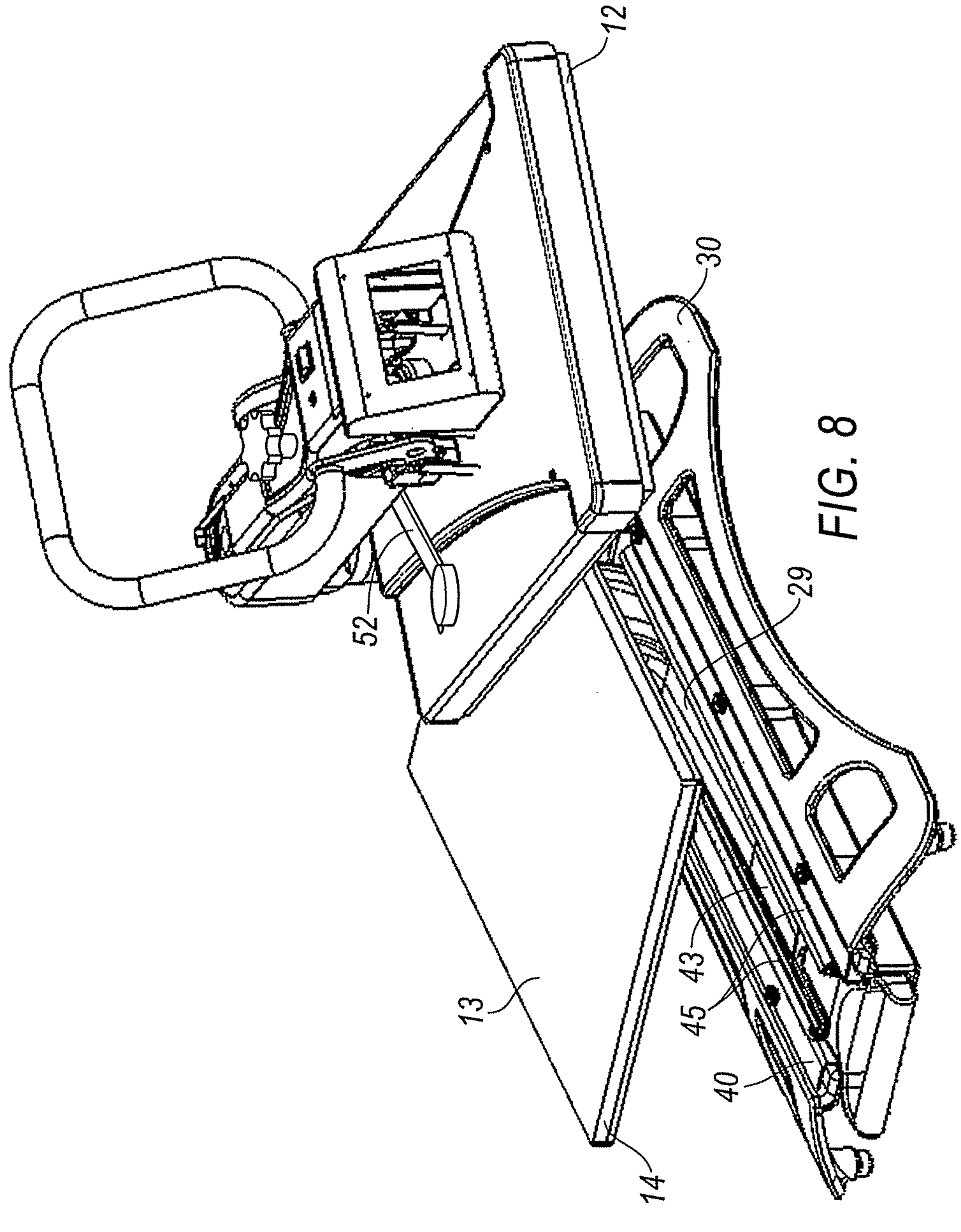
FIG. 8 illustrates a perspective view of an arrangement of a heat applied transfer press with an upper platen rotated to an approximate 130 degree angle.

The base frame central load supporting member 34 includes a central channel 36, and a central bore 38 for receiving the spindle tube 26. The central channel 36 receives a support channel 40 that is secured to the central channel 36 at apertures 42, and secured to a sliding mechanism 44 (FIG. 8). The sliding mechanism 44 includes sliders 45 and a draw tray 43. The sliders 45 are attached to the support channel 40 and the draw tray 43. The sliders 45 extend and retract the lower cantilever support arm 24. The draw tray 43 is shaped to be received within the support channel 40 and provides mounting walls for attaching the sliders 45, as well as creating a bed for attaching the lower cantilever support 24. Compression springs (not shown) are positioned between the draw tray 43 and the support channel 40. These compression springs hold the draw tray 43 in an elevated position above the support channel 40 to allow the draw tray 43 to slide translationally toward the operator to provide greater access to the lower platen 14 during apparel positioning. Compression of the springs occurs when activating the lift lever handle 20, thus resulting in the draw tray 43 compressing down into the support channel 40. This compression causes the draw tray 43 to lock into place, thus preventing the sliding mechanism 44 from translating out while the upper and lower platens 12, 14 are in the closed position and the heat press 10 is in operation. Therefore, by moving the lift lever 16 and releasing the locking assembly 18 to raise the upper platen 14 the springs are extended and the draw tray 43 is unlocked and free to move. Once the draw tray 43 is released it may slide in a translational direction to load or unload the textile.

Figure 4:
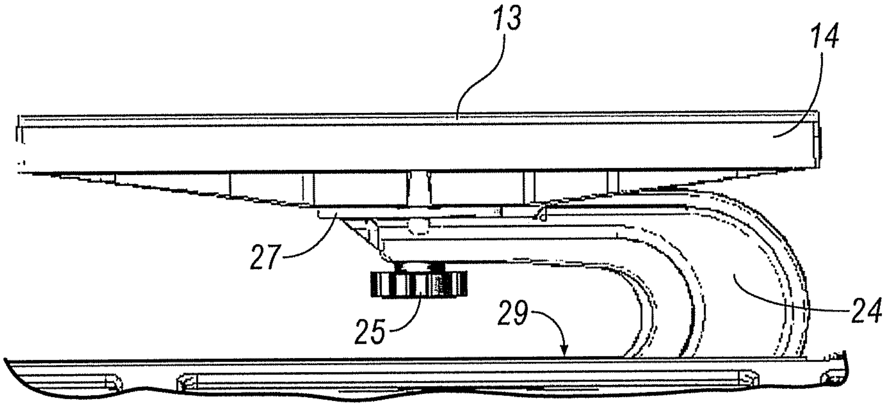
FIG. 4 is a side elevational view of a lower platen and a lower cantilever support arm interconnected.

FIG. 4 illustrates a side view of the lower cantilever support aim 24 removably attached to the lower platen 14. One arrangement for the lower cantilever support aim 24 is a c-shape design providing an open mouth area for sliding textiles or apparel onto the lower platen 14. However, other shapes may be employed provided they create an open space above and below the lower platen 14. The lower cantilever support arm 24 includes a lower platen mounting surface 27 and a draw tray mounting surface 29. The lower platen mounting surface 27 includes a ridge or tongue (not shown) running along a longitudinal axis. The tongue is configured to be received in a corresponding channel or groove (not shown) on an underside of the lower platen 14. The lower cantilever support arm 24 is fixedly attached to the draw tray 43 of the sliding mechanism 44. This attachment provides a straight line force distribution through the lower cantilever support arm 24 and into the base frame 30. The single casting c-shape of the lower cantilever support arm 24 provides greater strength and greater accessibility to the lower platen 14. The lower cantilever support arm 24 can be a single casting, a laminated construction, machined piece or any other known configuration. The arrangement shown is a single aluminum casting however, the lower cantilever support arm 24 may be constructed from any material providing a rigid platform, i.e., aluminum, iron, steel, powder metal or other known composite.

The lower platen 14 is generally rectangular in shape and includes a mounting channel on its base. However, the shape is not confined to a rectangle and may be of any desired shape. The lower cantilever support arm 24 includes a threaded aperture (not shown) adapted to receive a correspondingly threaded rod (not shown). The threaded rod extends through an aperture in the lower cantilever support arm 24 and is threadingly engaged with the lower platen 14. The removable connection allows the lower platen 14 to rotate providing a longer or wider working surface for varied shapes and sizes of textile or apparel. The lower platen 14 may also include multiple mounting channels or points to attach the lower platen 14 to the lower cantilever support arm 24. The mounting channel provides a recess for receiving the lower cantilever support arm 24 and prevents rotation of the lower platen 14 when tightened together. The knob 25 is threaded into the lower platen 14 to secure the lower cantilever support arm 24 onto the lower platen 14, which forces the lower cantilever support arm into the channel on the lower platen 14. However, when the knob 25 is loosened the lower platen 14 may be rotated horizontally 90 degrees in either direction to provide a longer work surface.

FIG. 5 illustrates a perspective view of the heat applied transfer press 10 illustrating the upper and lower platens 12, 14 with the lift lever 16 pulled forward, activating the locking assembly 18 to compress the platens 12, 14 together. A cover 55 is also illustrated, which encloses the locking assembly 18, the rotating assembly 28 and the controller 60 within the upper support arm 50. The cover 55 provides a shield against dirt and protects the controller 60 and corresponding electrical circuit from intrusion. The cover also provides support for the visual display 62, power switch 56 and power indicator light 57.

With continued reference to FIG. 5, lower platen 14 and the sliding mechanism 44 are in the retracted operating position. The sliding mechanism 44 is illustrated with the sliders 45 fixedly attached to the side walls of the draw tray 43. The sliding mechanism 44 provides translational movement to the lower platen 14, lower cantilever support arm 24 and draw tray 43. The sliding mechanism handle 46 is used by the operator to move the lower platen 14 from a closed working position to an open loading position. By pulling the lower platen 14 out the operator is given an obstructed working surface above and below the lower platen 14.

Figure 6:
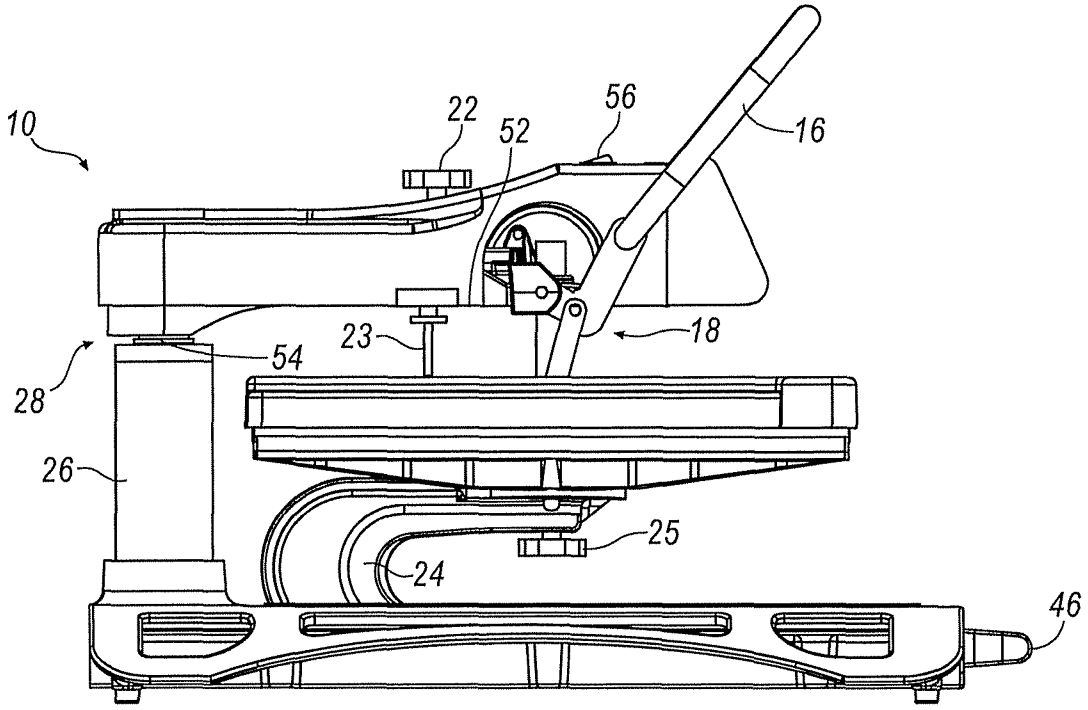
FIG. 6 illustrates a side elevational view of an arrangement of a transfer press with an upper and lower platen in the closed position.

FIG. 6 illustrates a side elevation view of the heat applied transfer press 10 illustrating the upper and lower platens 12, 14 in the closed position. The upper platen 12 adjuster 21 can be seen with the threaded rod 23 in the extended position and applying pressure to the upper and lower platens 12, 14. The knob handle 52 is clearly illustrated protruding from the underside of the upper support arm 50. The knob handle 52, as stated previously, provides the operator a graspable extension to rotate the upper support arm 50 and upper platen 12 from an operational position of 0 degrees to a counter-clockwise angle of approximately 130 degrees for loading a textile or apparel.

Figure 7:
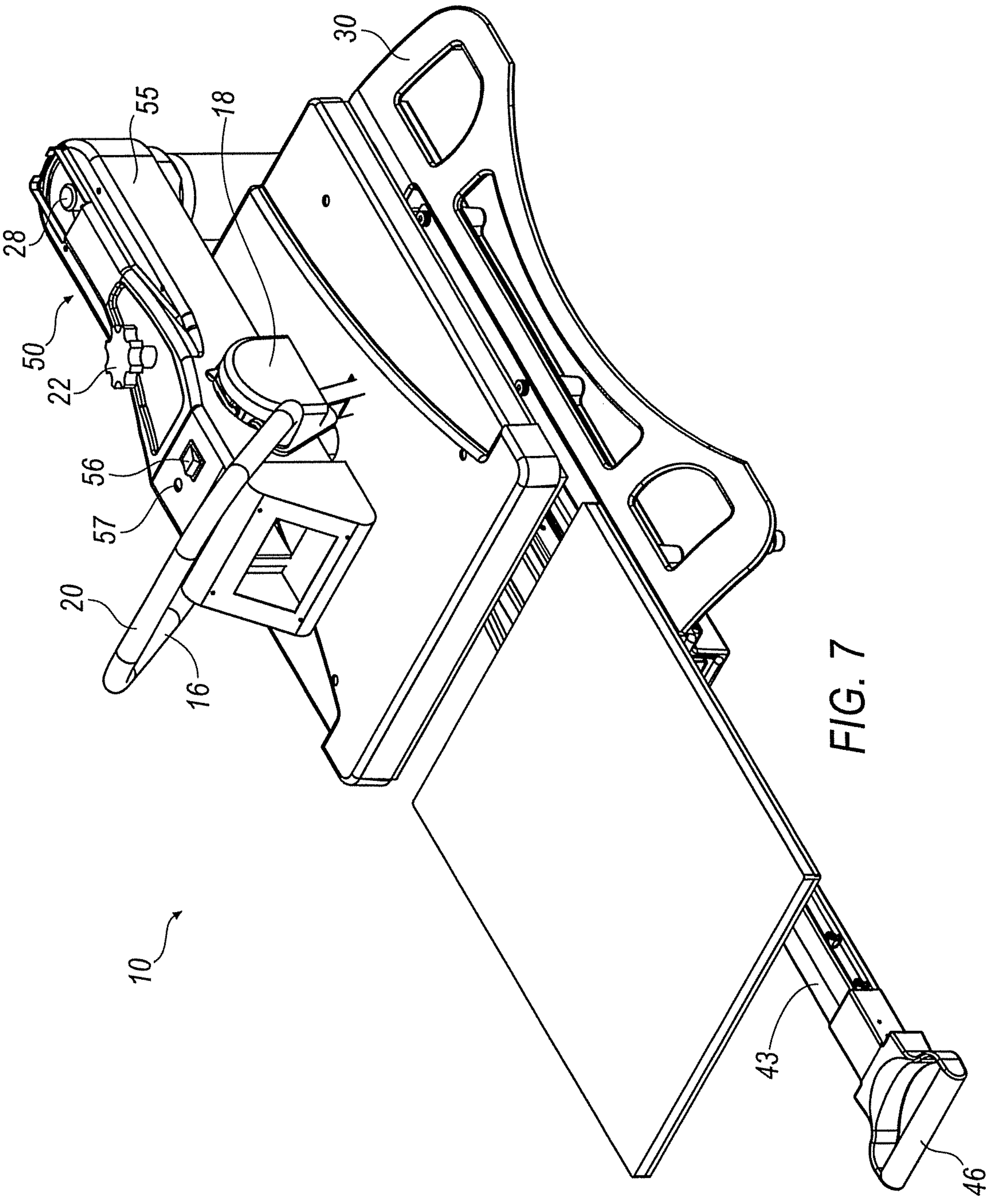
FIG. 7 illustrates a perspective view of an arrangement of a heat applied transfer press with a lower platen extended translationally.

FIG. 7 illustrates a perspective view of the heat applied transfer press 10, the lower platen 14 is extended translationally out toward the operator for loading and unloading the lower platen 14 insulating pad 13 work surface. The upper support arm 50 and upper platen 12 are in a hover position awaiting loading of the lower platen 14 and retraction back to an operating position.

FIG. 8 illustrates a perspective view of the heat applied transfer press 10 illustrating the upper platen 12 rotated to an approximate 130 degree angle. The movement of the upper platen 12 provides a second means of providing an unobstructed work area on the lower platen 14 by rotating the upper support arm 50 and upper platen 12 to keep the heating element in the upper platen 12 from hovering over the lower platen 14 thus preventing possible injuries from the heated upper platen 12. A rotational swing-lock mechanism 54 is positioned in an aperture on the left swing-lock ring that is positioned between the upper support arm 50 and the spindle tube 26. The swing-lock mechanism 54 is provided to lock the upper platen 12 and correspondingly the upper support arm 50 at the working position of 0 degrees.

What is claimed is:

1. A press comprising:

an upper platen;

an upper support arm adapted to selectively rotate and move said upper platen between an open position, a partially open position and a closed position;

a locking mechanism supporting said upper platen from said support arm, said locking mechanism configured to align said upper platen substantially parallel with a lower platen of the press, wherein pressure exerted by said upper platen upon the lower platen is substantially equalized across the face of said upper platen;

a cantilever lower support arm adapted to support the lower platen;

a base assembly adapted to support the cantilever lower support arm and the upper support arm, wherein the base assembly houses a sliding mechanism for selectively moving the lower platen translationally; and a lower support arm locking mechanism configured to selectively secure the lower platen to the base.

2. The press of claim 1, further including an upper support arm of a first material and spindle tube of a second material wherein the two materials are dissimilar and are mechanically fused together.

3. The press of claim 1, further including at least one heating element in mechanical communication with said upper platen.

4. The press of claim 1, wherein the lower platen is disposed below and generally aligned with said upper platen, and wherein an unobstructed work surface is provided above and below the lower platen.

5. The press of claim 1, wherein said lower support arm locking mechanism is spring activated.

6. The press of claim 1, further including at least one compression spring disposed between said base of said press and said lower cantilever support arm adapted to lock said lower platen to said base.

7. The press of claim 1, further including a controller for signaling that at least one of a predetermined temperature, a predetermined time, and a predetermined pressure is achieved.

8. The press of claim 6, further including a visual indicator for inputting at least one of a predetermined temperature, a predetermined time, and a predetermined pressure.

9. The press of claim 1, further including a controller having a remote diagnostic input.

10. The press of claim 1, further including a controller having an updating input.

11. The press of claim 1, further including a controller having integrated inputs and visual display for predetermined inputs and real-time parameters.

12. The press in claim 1, further comprising a control system to set variable time, temperature and pressure combinations and to receive feedback on the said variable time, temperature and pressure combinations.

13. The press of claim 1, wherein the lower platen is disposed below and generally aligned with said upper platen such that an upper work surface of the lower platen is in direct contact with the upper platen when the upper platen is placed in the closed position.

14. The press of claim 13, wherein the cantilever lower support arm defines a space below the lower platen that remains unobstructed when the upper platen is placed in the closed position such that a garment threaded over the lower platen may be positioned in the space.

15. The press of claim 14, wherein the space extends across greater than half of an extent of the upper work surface of the lower platen.

16. The press of claim 14, wherein the cantilever lower support arm includes a c-shaped support defining the space.

17. The press of claim 4, wherein the lower platen is disposed below and generally aligned with said upper platen such that an upper work surface of the lower platen is in direct contact with the lower platen when the upper platen is placed in the closed position.

18. The press of claim 1, wherein the upper support arm is configured to selectively move the upper platen in a first direction between the open position and the closed position, and wherein the sliding mechanism is configured to slide the cantilever support arm in a second direction generally orthogonal to the first direction, the sliding mechanism maintaining contact between the cantilever support arm and the base assembly while the base assembly remains stationary.

19. The press of claim 1, wherein the base support defines a channel extending generally parallel to the second direction such that the cantilever support arm slides along the channel when the cantilever support arm slides along the second direction.

* * * * *